United States Patent
Nagano et al.

(10) Patent No.: US 11,448,821 B2
(45) Date of Patent: Sep. 20, 2022

(54) SLANT-TYPE FIBER GRATING

(71) Applicant: SUMITOMO ELECTRIC INDUSTRIES, LTD., Osaka (JP)

(72) Inventors: Shigehiro Nagano, Osaka (JP); Manabu Shiozaki, Osaka (JP); Jun Kinugasa, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/223,424

(22) Filed: Apr. 6, 2021

(65) Prior Publication Data

US 2021/0223468 A1    Jul. 22, 2021

Related U.S. Application Data

(63) Continuation of application No. PCT/JP2019/040531, filed on Oct. 15, 2019.

(30) Foreign Application Priority Data

Oct. 29, 2018   (JP) .............................. JP2018-202609

(51) Int. Cl.
   *G02B 6/02*   (2006.01)

(52) U.S. Cl.
   CPC ..... *G02B 6/02085* (2013.01); *G02B 6/02004* (2013.01)

(58) Field of Classification Search
   CPC .................. G02B 6/02085; G02B 6/02004
   See application file for complete search history.

(56) References Cited

U.S. PATENT DOCUMENTS

| 5,732,170 A | 3/1998 | Okude et al. |
| 6,104,852 A | 8/2000 | Kashyap |

(Continued)

FOREIGN PATENT DOCUMENTS

| JP | H08-286061 A | 11/1996 |
| JP | 2001-524689 A | 12/2001 |

(Continued)

OTHER PUBLICATIONS

Nov. 12, 2019 International Search Report issued in International Patent Application No. PCT/JP2019/040531.

*Primary Examiner* — Sung H Pak
(74) *Attorney, Agent, or Firm* — Oliff PLC

(57) ABSTRACT

One embodiment of the present disclosure relates to an SFG (slanted fiber grating) that can easily realize a high-performance gain equalizer. The SFG includes an optical fiber comprised of silica-based glass and including a core, a first cladding containing a photosensitive material, and a second cladding. A specific section between two different points arranged along a fiber axis in the optical fiber is configured with a first region, a pair of second regions, and a third region. The first region includes a slanted Bragg grating provided in a region as the first cladding. The pair of second regions are arranged to sandwich the first region. The third region is disposed to sandwich both the first region and the pair of second regions. An MFD at a wavelength of 1.55 μm in the third region is smaller than an MFD at a wavelength of 1.55 μm in the first region.

9 Claims, 9 Drawing Sheets

(56) References Cited

U.S. PATENT DOCUMENTS

| | | | | |
|---|---|---|---|---|
| 6,594,423 B2 * | 7/2003 | Sakamoto | .......... | G02B 6/02119 385/124 |
| 2002/0034368 A1 | 3/2002 | Sheu et al. | | |
| 2002/0186944 A1 | 12/2002 | Riant et al. | | |
| 2004/0151467 A1 | 8/2004 | Ishikawa et al. | | |
| 2004/0218859 A1 | 11/2004 | Yamashita et al. | | |
| 2016/0109650 A1 | 4/2016 | Nagashima et al. | | |

FOREIGN PATENT DOCUMENTS

| | | | |
|---|---|---|---|
| JP | 2003-004926 | A | 1/2003 |
| JP | 2003-004957 | A | 1/2003 |
| JP | 2003-075647 | A | 3/2003 |
| JP | 2003-202434 | A | 7/2003 |
| JP | 2004-170476 | A | 6/2004 |
| JP | 2016-081032 | A | 5/2016 |
| WO | 99/027401 | A1 | 6/1999 |
| WO | 03/093887 | A1 | 11/2003 |
| WO | 2017/073670 | A1 | 5/2017 |

* cited by examiner

SLANT-TYPE FIBER GRATING

CROSS-REFERENCE TO RELATED APPLICATIONS

This application is a continuation application of PCT/JP2019/040531 claiming the benefit of priority of the Japanese Patent Application No. 2018-202609 filed on Oct. 29, 2018, the entire contents of which are incorporated herein by reference.

TECHNICAL FIELD

The present disclosure relates to a slanted fiber grating.

BACKGROUND ART

In a long-distance optical fiber communication system using C-band or L-band signal light, an optical fiber amplifier including an optical fiber for amplification, to which a rare earth element such as erbium (Er) is doped, is used as optical amplifier that amplifies the signal light. The gain spectrum of the erbium-doped optical fiber amplifier (EDFA) has wavelength dependency and has a peak near the wavelength of 1.53 μm. The bit error rate increases due to non-flatness of the wavelength dependency of the gain spectrum. As a result, the performance of a transmission system deteriorates. As a component for solving such a problem, a slanted fiber grating (SFG), which is a gain equalizer that equalizes the gain of the EDFA, has been developed.

Examples of manufacturing the gain equalizer are disclosed in, for example, Patent Document 1 and Patent Document 2. In the production example, firstly, an optical fiber that is comprised of silica-based glass and in which a photosensitive material (for example, $GeO_2$ and $B_2O_3$) is contained in both or either the core and/or the cladding is prepared. When the optical fiber is irradiated with ultraviolet light having a specific wavelength that may increase the refractive index (for example, a second harmonic of argon ion laser light (wavelength 244 nm) and the like), the refractive index of the silica-based glass containing a photosensitive material increases. As methods of writing a refractive index-modulated grating with a predetermined period in an optical fiber, there are exposure with ±1st-order diffracted light using a chirp-type grating phase mask, direct exposure with UV laser light, and double-beam interference exposure. Among the methods, the method using a phase mask has advantages that a grating having the same characteristics is produced with high reproducibility and that alignment is relatively easy as compared with other methods.

The loss due to the SFG is caused by the coupling from the LP01 mode to the higher-order mode in backward propagation. The loss spectrum of the SFG obtained by grating written with light having a specific wavelength of a certain beam width has a loss peak at a certain wavelength and a full width at half maximum (FWHM) α as illustrated in FIG. 1. In addition, the loss spectrum of the SFG is a fundamental spectrum in which the loss is tailed to the short wavelength side from the loss peak wavelength. The desired loss spectrum of the gain equalizer is realized by superimposing a plurality of fundamental spectra in a transmittance axis direction and a wavelength axis direction, as illustrated in FIG. 2. As described above, the gain of the EDFA is equalized by the gain equalizer in which the plurality of fundamental spectra of the SFG are superimposed.

CITATION LIST

Patent Literature

Patent Document 1: Japanese Patent Application Laid-Open No. 2003-004926
Patent Document 2: Japanese Patent Application Laid-Open No. 2004-170476
Patent Document 3: Japanese Patent Application Laid-Open No. 2003-075647

SUMMARY OF INVENTION

According to the present disclosure, as an example, an SFG (slanted fiber grating) includes an optical fiber comprised of silica-based glass, the optical fiber including a core, a first cladding, and a second cladding. The core extends along a fiber axis direction. In a cross section perpendicular to the fiber axis direction (cross section of the optical fiber), the first cladding is a region surrounding the core, and the second cladding is a region surrounding the first cladding. The first cladding has at least a portion containing a photosensitive material that increases a refractive index of at least the portion by irradiation with light having a specific wavelength and has a refractive index lower than a refractive index of the core. The second cladding has a refractive index that is lower than the refractive index of the core and higher than the refractive index of the first cladding. In particular, a specific section of the optical fiber, which is defined along the fiber axis direction, is configured with a first region, a pair of second regions arranged along the fiber axis direction to sandwich the first region, and a pair of third regions arranged along the fiber axis direction to sandwich both the first region and the pair of second regions. The first region has a first mode field diameter at a wavelength of 1.55 μm, and includes a slanted Bragg grating having an iso-refractive index surface (surface three-dimensionally connecting points having an equal refractive index) tilted to the cross section. The slanted Bragg grating is provided in a region corresponding to the first cladding in the first region. The third region has a second mode field diameter smaller than the first mode field diameter at a wavelength of 1.55 μm.

DESCRIPTION OF EMBODIMENTS

Technical Problem

Figure 1:
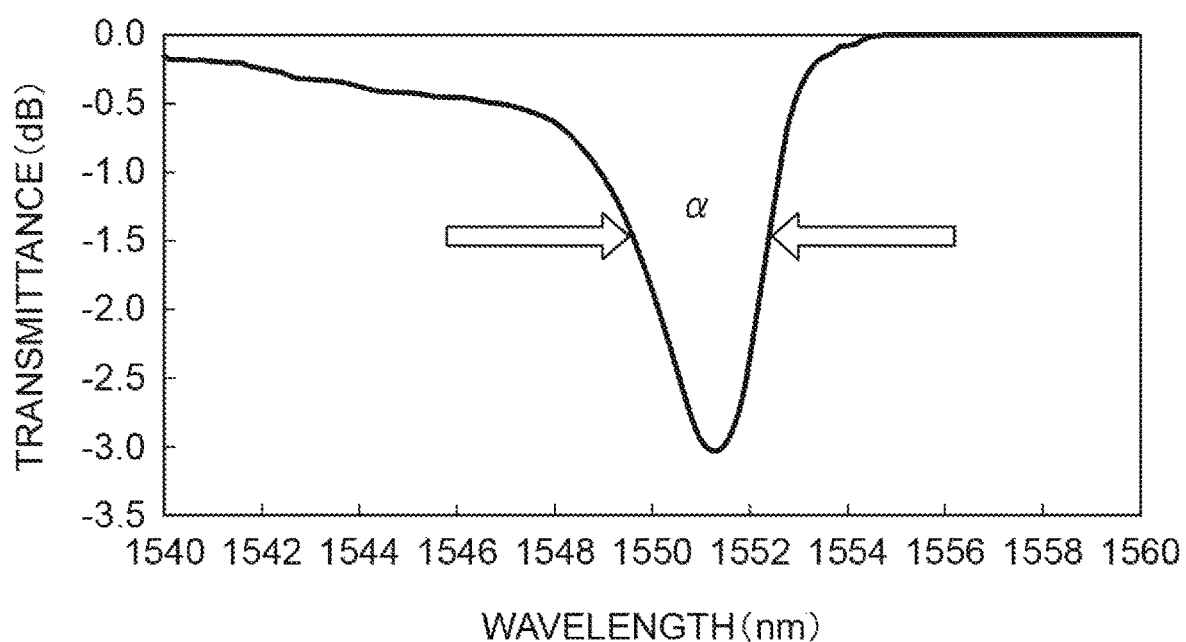
FIG. 1 illustrates a loss spectrum (fundamental spectrum) of an SFG.
Figure 2:
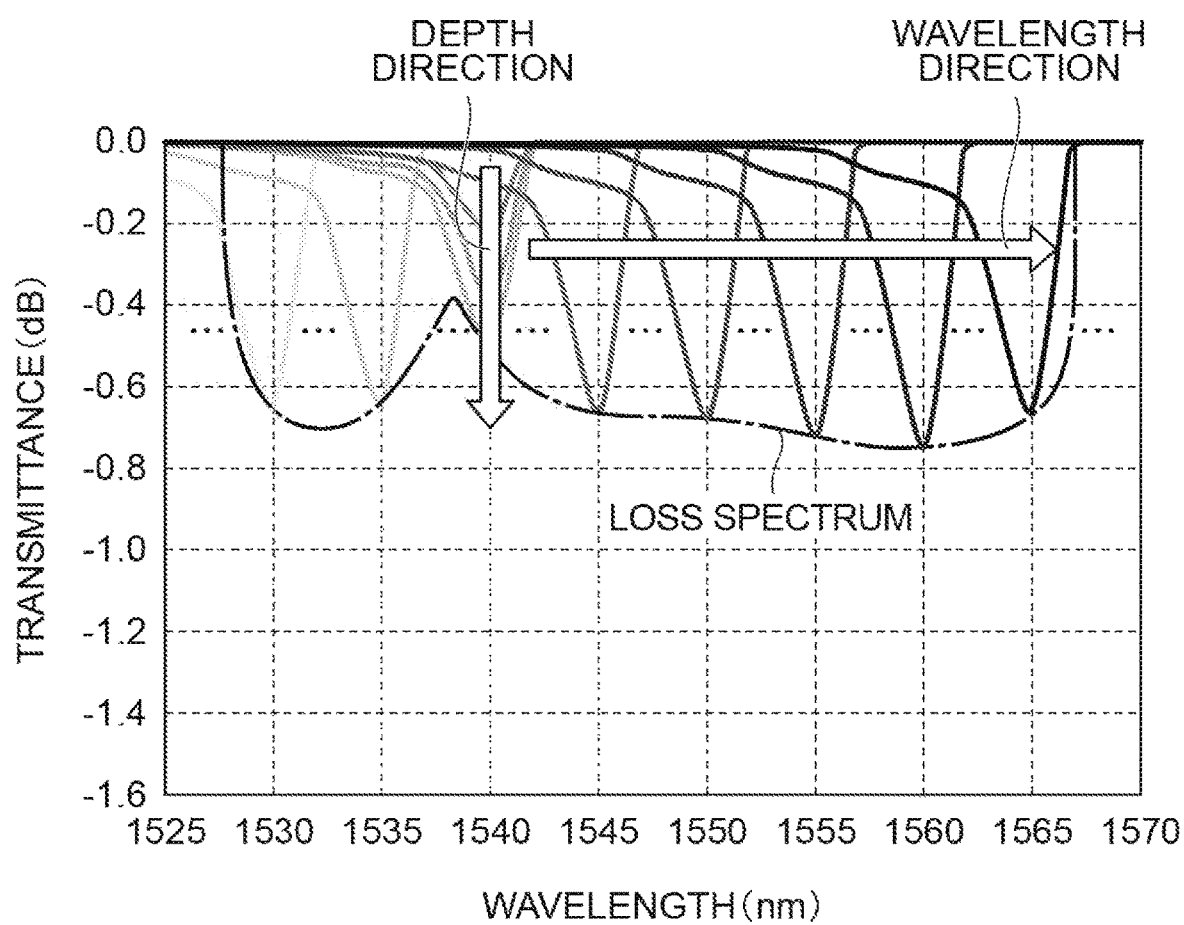
FIG. 2 is a diagram for explaining superimposition of a plurality of fundamental spectra of the SFG.

As a result of examining the above-described related art, the inventors have discovered problems as follows. That is, in recent years, with the development of the use of IoT and big data, it is required to increase the transmission capacity and further reduce the bit error rate (improve the performance of the gain equalizer by the SFG). However, due to the limitation of the full width at half maximum α of the fundamental spectrum, it is difficult to realize a desired loss spectrum with high accuracy even though a plurality of fundamental spectra are superimposed.

Advantageous Effects of Invention

The present disclosure makes it possible to provide an SFG that may easily realize a high-performance gain equalizer.

Descriptions of Embodiments of Disclosure

Firstly, details of embodiments of the present disclosure will be individually described in order.

(1) According to the present disclosure, as an aspect, an SFG (slanted fiber grating) includes an optical fiber comprised of silica-based glass including a core, a first cladding, and a second cladding. The core extends along a fiber axis direction. In a cross section perpendicular to the fiber axis direction (cross section of the optical fiber), the first cladding is a region surrounding the core, and the second cladding is a region surrounding the first cladding. The first cladding has at least a portion containing a photosensitive material that increases a refractive index of at least the portion by irradiation with light having a specific wavelength and has a refractive index lower than a refractive index of the core. The second cladding has a refractive index that is lower than the refractive index of the core and higher than the refractive index of the first cladding. In particular, a specific section located between two different points arranged along the fiber axis direction in the optical fiber is configured with a first region, a pair of second regions arranged along the fiber axis direction to sandwich the first region, and a pair of third regions arranged along the fiber axis direction to sandwich both the first region and the pair of second regions. The first region has a first mode field diameter at a wavelength of 1.55 μm and includes a slanted Bragg grating that has an iso-refractive index surface tilted to the cross section, and is formed in a region corresponding to the first cladding. The slanted Bragg grating is provided in a region corresponding to the first cladding in the first region. The third region has a second mode field diameter smaller than the first mode field diameter at a wavelength of 1.55 μm.

Note that, each of the first region, the second regions, and the third region described above is configured with a core, a first cladding, and a second cladding (each region has the same cross-sectional configuration as a cross-sectional configuration of the optical fiber). Further, the outer diameters of the first region, the second regions, and the third regions are not substantially changed along a fiber axis (the outer diameter of each region is not intentionally changed along the fiber axis). In other words, the structure and the composition of the optical fiber before ultraviolet light irradiation is uniform over the first, second, and third regions. Further, since the slanted Bragg grating is formed in a region containing a photosensitive material, the slanted Bragg grating is formed in the first cladding without being formed in the core. Thus, the slanted Bragg grating is located in a region sandwiched by a boundary between the core and the first cladding (inner boundary) and a boundary between the first cladding and the second cladding (outer boundary). Note that, the slanted Bragg grating in the first region has a slant angle θ (angle set using, as a reference, an angle of the grating at which the return light is most suppressed).

(2) As an aspect of the present disclosure, it is preferable that the first cladding contains $GeO_2$ as the photosensitive material. Further, as an aspect of the present disclosure, it is preferable that the first cladding further contains $B_2O_3$ as the photosensitive material. Further, as an aspect of the present disclosure, both the first cladding and the second cladding may contain F (fluorine element).

(3) As an aspect of the present disclosure, it is preferable that a second mode field diameter in each of the pair of third regions is equal to or smaller than 11.5 μm. Further, as an aspect of the present disclosure, it is preferable that the first mode field diameter in the first region is equal to or greater than 12.0 μm. Meanwhile, as an aspect of the present disclosure, the mode field diameter at a wavelength of 1.55 μm in one of the pair of second regions gradually decreases along a direction from one end portion of the first region toward one of the pair of third regions. Further, it is preferable that the mode field diameter at the wavelength of 1.55 μm in the other of the pair of second regions gradually decreases in a direction from the other end portion of the first region toward the other of the pair of third regions. Note that, when the first region, the second region, and the third region are continuous regions, the mode field diameter of the second region (mode field diameter at the wavelength of 1.55 μm) is equal to the first mode field diameter at the boundary between the first region and the second region. Further, at the boundary between the third region and the second region, the mode field diameter of the second region is equal to the second mode field diameter.

(4) As an aspect of the present disclosure, it is preferable that the length of the first region defined along the fiber axis direction is from 10 mm to 100 mm. Further, as an aspect of the present disclosure, the first region may include an MFD adjustment Bragg grating disposed at a position different from the slanted Bragg grating along the fiber axis direction. In this case, the MFD adjustment Bragg grating has an iso-refractive index surface perpendicular to the fiber axis direction, and functions to Bragg-reflect light in a wavelength band different from a loss wavelength band of the slanted Bragg grating.

As described above, each of the aspects listed in this section [Description of Embodiments of Disclosure] is applicable to each of all the remaining aspects or to all combinations of the remaining aspects.

Details of Embodiments of Present Disclosure

The specific structure of the SFG (slanted fiber grating) according to the embodiment of the present disclosure will be described below in detail with reference to the accompanying drawings. Note that, the present invention is not limited to the examples. The present invention is defined by the claims, and is intended to include any change within the meaning and the scope equivalent to those of the claims. In the descriptions of the drawings, the same components are denoted by the same reference signs, and repetitive descriptions will be omitted.

In order to improve the performance of a gain equalizer, it is desirable to increase the maximum loss amount of the grating and to reduce the full width at half maximum α of the fundamental spectrum of the SFG while maintaining the capability (writing capability) to match the target spectrum (narrow the fundamental spectrum).

In order to narrow the band of the fundamental spectrum of the SFG, it is necessary to reduce the angle of the grating with respect to a surface (fiber cross section) perpendicular to a light propagation direction (fiber axis direction). Here, the angle of the grating is an angle formed by the iso-refractive index surface of the grating with respect to a wave surface on which the light of the LP01 mode propagates. That is, a case the angle of the grating is zero means that the light propagation wave surface in the LP01 mode and the iso-refractive index surface of the grating coincide with each other, and the FWHM at this time has the smallest value. However, the return light reflected by the grating is coupled to the LP01 mode in a direction opposite to a propagation direction of a signal light and propagates. As a result, the return light returns to an EDF that constitutes an EDFA, and this causes deterioration of amplification efficiency/noise characteristics and deterioration of transmission quality. Thus, just because the full width at half maximum α can be reduced, it is not possible to simply set the angle of the grating to zero.

Figure 3:
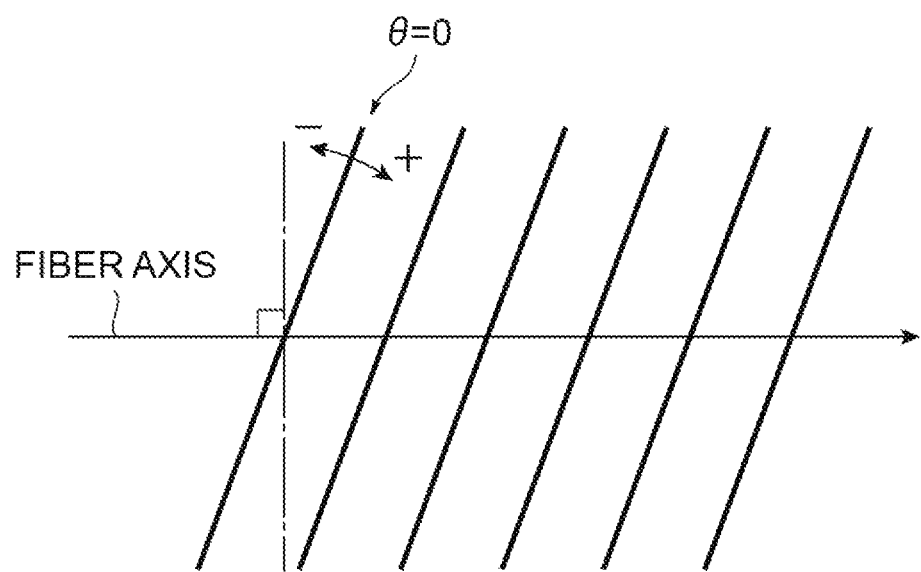
FIG. 3 is a diagram for explaining a slant angle θ.
Figure 4A:
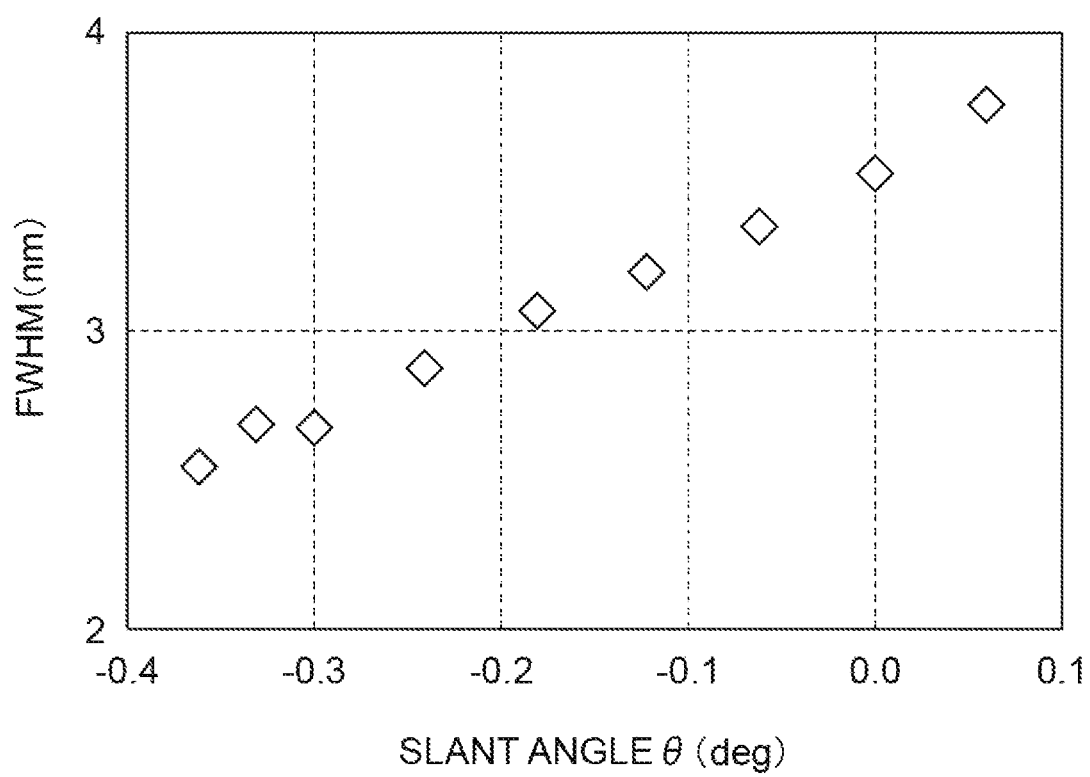
FIG. 4A is a graph illustrating a relation between the full width at half maximum α of the fundamental spectrum of the SFG and the slant angle θ.
Figure 4B:
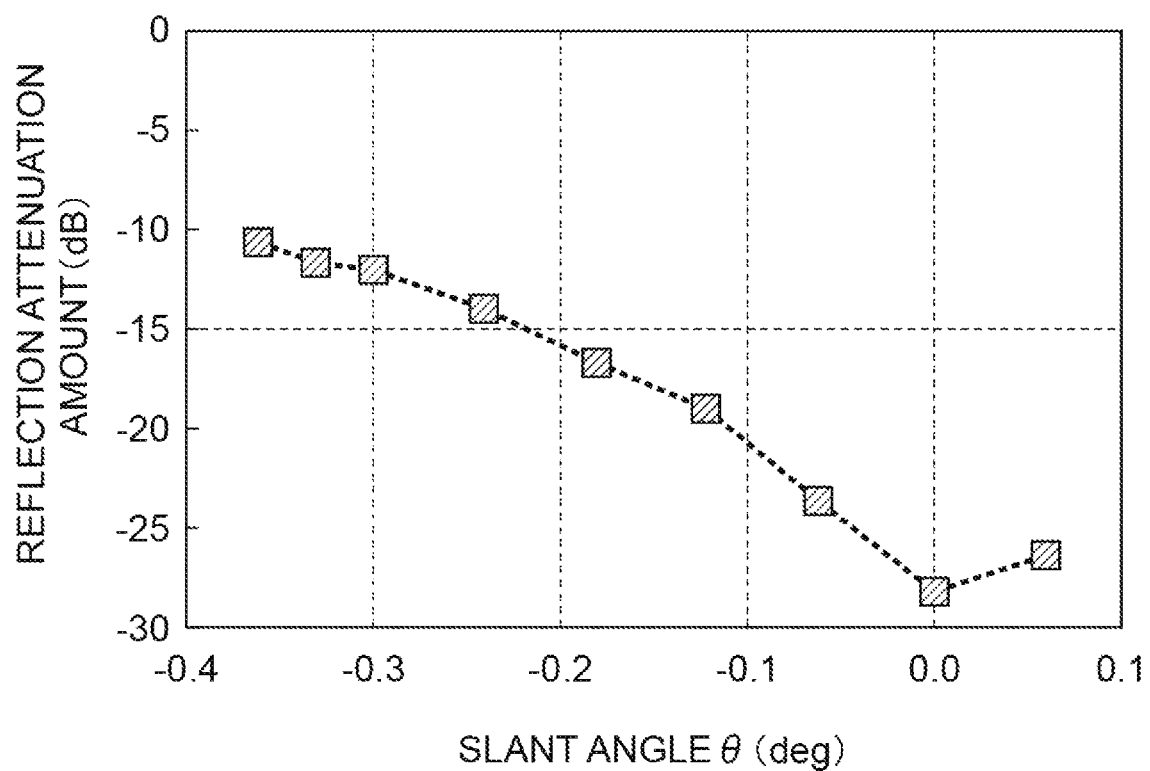
FIG. 4B is a diagram illustrating a relation between a reflection attenuation amount of the SFG and the slant angle θ.

When the iso-refractive index surface of the grating is tilted in a direction of increasing the angle of the grating, the return light is suppressed. The return light is most suppressed at a certain grating angle, and the slant angle θ is defined with this angle as the origin (FIGS. 3, 4A, and 4B). That is, the slant angle being θ=0 means the angle of the grating at which the return light is most suppressed, and corresponds to the angle of the grating of about 1° to 3° when the wave surface on which the light propagates is 0 degrees. Further, when the angle of the grating is increased, the return light increases again. FIG. 3 illustrates the grating with a plurality of lines at regular intervals. FIG. 4A illustrates a relation between the slant angle θ (deg) and the full width at half maximum α (FWHM (nm)). Further, as illustrated in FIG. 4B, when the slant angle θ decreases, the reflection attenuation amount (dB) increases. When the return light increases due to the increase in the reflection attenuation amount, the light returns to the EDF constituting the EDFA. Thus, for example, the limit is to reduce the angle of the grating by about 0.1 degree with respect to the slant angle θ=0.

From the above description, in order to reduce the full width at half maximum α of the fundamental spectrum of the SFG, it is necessary to reduce the angle of the grating that realizes the slant angle θ=0. Note that, it is known that the angle of the grating that realizes the slant angle θ=0 can be reduced by increasing the mode field diameter of the optical fiber (Patent Document 3). According to Patent Document 3, a mode field diameter MFD1 in the SFG region is required to be equal to or greater than 15 μm, and a mode field diameter MFD3 in the other handling regions is required to be equal to or smaller than 12 μm, which is resistant to a bending loss. In order to connect two optical fibers having different MFDs to each other without a loss, it is necessary to gradually convert the mode field diameter from MFD3 to MFD1.

In Patent Document 3, a method in which an optical fiber containing $GeO_2$ in the core is prepared, and $GeO_2$ contained in the core is thermally diffused to form an MFD conversion portion in which the mode field diameter is gradually increased from MFD3 to MFD1 has been proposed. However, in this method, the concentration of $GeO_2$, which is a photosensitive material, in the MFD1 region is reduced. The threshold of $GeO_2$ concentration required for grating writing by ultraviolet light irradiation is equal to or greater than Δ0.35% as a ratio of the amount of increase in the refractive index due to $GeO_2$ at the concentration to the refractive index of pure $SiO_2$ glass. This makes it difficult to write the periodic refractive index modulation to the MFD1 region, and as a result, it is not possible to form the desired light loss. Thus, in addition to the optical fiber having a handling region satisfying MFD3, an optical fiber with a guaranteed writing depth is prepared. The two optical fibers are fused and connected, and MFD conversion is performed by thermal diffusion or the like in a predetermined range including the fusional connection point.

However, the method disclosed in Patent Document 3 has a problem that a fusion loss occurs in addition to an increase in the unit price caused by an increase in the manufacturing process. In the embodiment described below, it is possible to provide a slanted fiber grating (SFG) that may easily realize a high-performance gain equalizer.

Figure 5:
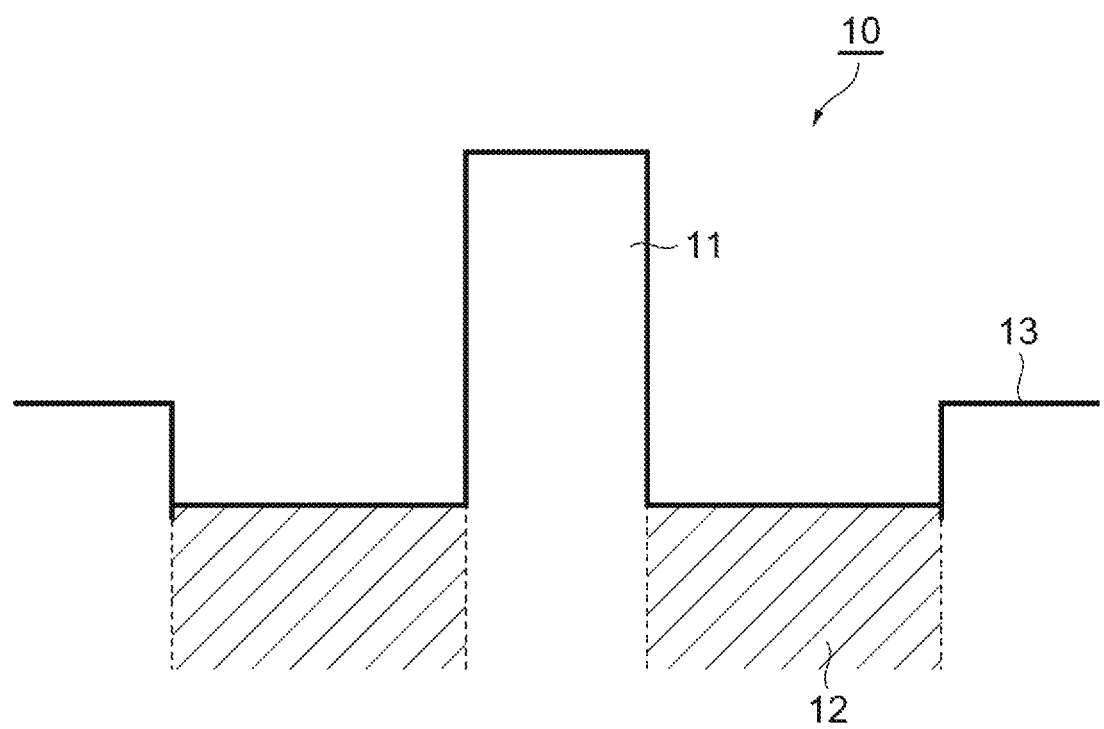
FIG. 5 illustrates a refractive index profile along a radial direction of an optical fiber.

FIG. 5 illustrates a refractive index profile along a radial direction of the optical fiber on which the slanted Bragg grating is formed. The slanted Bragg grating of the SFG in the present embodiment is formed as an optical fiber having the refractive index profile illustrated in FIG. 5. An optical fiber 10 is an optical fiber comprised of silica-based glass. The optical fiber includes a core 11, a first cladding (optical cladding) 12 surrounding the core 11, and a second cladding (jacket) 13 surrounding the first cladding 12. The first cladding 12 has a refractive index lower than the refractive index of the core 11. The second cladding has a refractive index lower than the refractive index of the core 11 and higher than the refractive index of the first cladding 12.

The boundary between the core 11 and the first cladding 12 is defined at a position at which the gradient of the refractive index is maximized. The boundary between the first cladding 12 and the second cladding 13 is defined at a position at which the gradient of the refractive index between the first cladding 12 and the second cladding 13 is maximized. The core 11 has a relative refractive index difference $\Delta n_{core}$ at the center of the core. The first cladding 12 has a relative refractive index difference $\Delta n_{clad1}$ smaller than $\Delta n_{core}$. The second cladding 13 has a relative refractive index difference $\Delta n_{clad2}$ that is smaller than $\Delta n_{core}$ and larger than $\Delta n_{clad1}$. $\Delta n_{clad1}$ is a value taken by the approximate straight line of the refractive index profile in the first cladding 12 at the boundary between the core 11 and the first cladding 12. Here, the approximate straight line of the refractive index profile in the first cladding 12 is a straight line connecting the refractive index at a position spaced outward by 1 μm along the radial direction from the boundary between the core 11 and the first cladding 12 with the refractive index at a position spaced by 1 μm toward the center of the core from the boundary between the second cladding 13 and the first cladding 12. Note that, the relative refractive index difference of each portion has a value based on the refractive index of pure $SiO_2$ glass.

At least a portion of the first cladding 12 contains a photosensitive material that increases the refractive index by irradiation with light in a specific wavelength. The first cladding 12 may contain $GeO_2$ as the photosensitive material and may further contain $B_2O_3$ as the photosensitive material. The core 11 and the second cladding 13 do not substantially contain the photosensitive material. The first cladding 12 and the second cladding 13 contain F.

Figure 6:
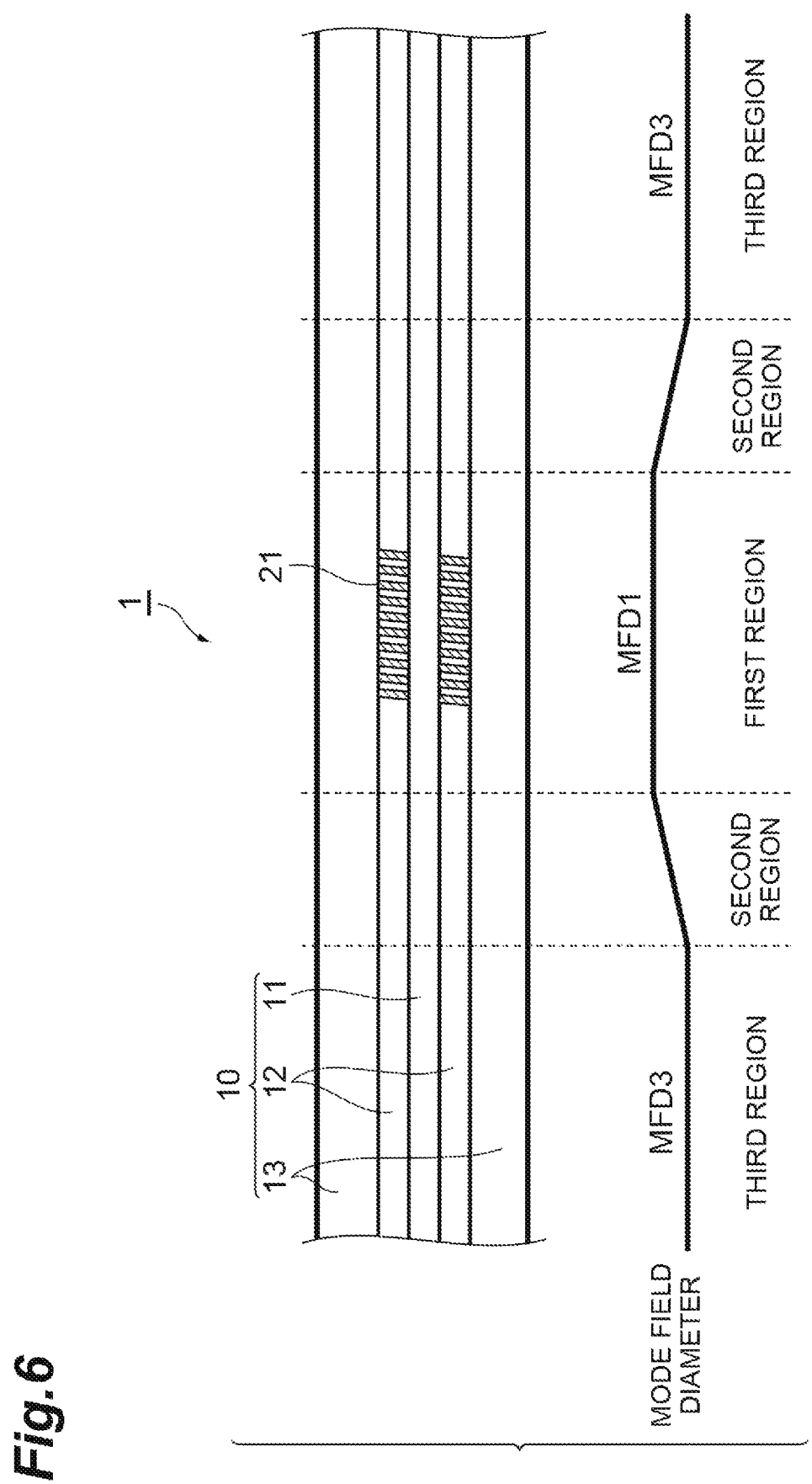
FIG. 6 is a diagram illustrating a configuration of an SFG 1 according to the present embodiment.

FIG. 6 is a diagram illustrating a configuration of an SFG 1 in the present embodiment. A slanted Bragg grating 21 of the SFG 1 is formed on one optical fiber 10. The SFG 1 has a specific section divided into a first region, a second region, and a third region along the fiber axis direction. This specific section is a section having both ends that are defined along a fiber axis in the optical fiber 10. The first region is straight. A pair of second regions are provided on both sides of the first region, and a pair of third regions are further provided to sandwich the pair of second regions. The structure and the composition of the optical fiber 10 before ultraviolet light irradiation is uniform over the three regions.

The slanted Bragg grating 21 having a slant angle θ is formed in the first region. The mode field diameter MFD1 of the first region is larger than the mode field diameter MFD3 of the third region at the wavelength of 1.55 μm. It is preferable that the mode field diameter MFD3 of the third region is equal to or smaller than 11.5 μm at the wavelength of 1.55 μm. It is preferable that the mode field diameter MFD1 of the first region is equal to or greater than 12.0 μm at the wavelength of 1.55 μm. In the following description, all MFD1 and MFD3 are values at the wavelength of 1.55 μm. It is preferable that the mode field diameter in each of the pair of second regions gradually decreases from both ends of the first region toward each of the pair of third regions. The length of the first region defined along the fiber axis direction is from 10 mm to 100 mm, preferably from 20 mm to 80 mm.

The mode field diameter of the optical fiber 10 before ultraviolet light irradiation is MFD3. By irradiating each of the first region and the second region with ultraviolet light, it is possible to set the mode field diameter of the first region to the desired MFD1, and to gradually decrease the mode field diameter of the second region from the side of the first region toward the side of the third region.

The refractive index of the region (at least a portion of the first cladding 12) containing the photosensitive material increases by ultraviolet light irradiation. Since the core 11 and the second cladding 13 are non-photosensitive, but the first cladding 12 is photosensitive, the refractive index of the first cladding 12 increases by ultraviolet light irradiation. Thus, the relative refractive index difference of the core 11 from the first cladding 12 decreases, and the mode field diameter increases. The relative refractive index difference of the core 11 is for the core center position.

In the irradiation of the second region with ultraviolet light irradiation, the second region is irradiated with the ultraviolet light without passing through a phase mask. At this time, by changing the irradiation amount of ultraviolet light along the fiber axis direction while performing irradiation with ultraviolet light, it is possible to gradually change the mode field diameter of the second region from MFD1 to MFD3 along the fiber axis direction.

A method of setting the mode field diameter MFD1 and forming the slanted Bragg grating in the first region is as follows. The first region is irradiated with ultraviolet light without passing through a phase mask. At this time, irradiation with the ultraviolet light is uniformly performed along the fiber axis direction with the irradiation amount of ultraviolet light required to realize the mode field diameter MFD1. Thus, it is possible to set the mode field diameter of the first region to the desired MFD1. Then, by irradiating the first region with ultraviolet light ($UV_{grating}$) through the phase mask, the slanted Bragg grating 21 which is a periodic refractive index modulation for forming a predetermined loss spectrum is formed.

Figure 7:
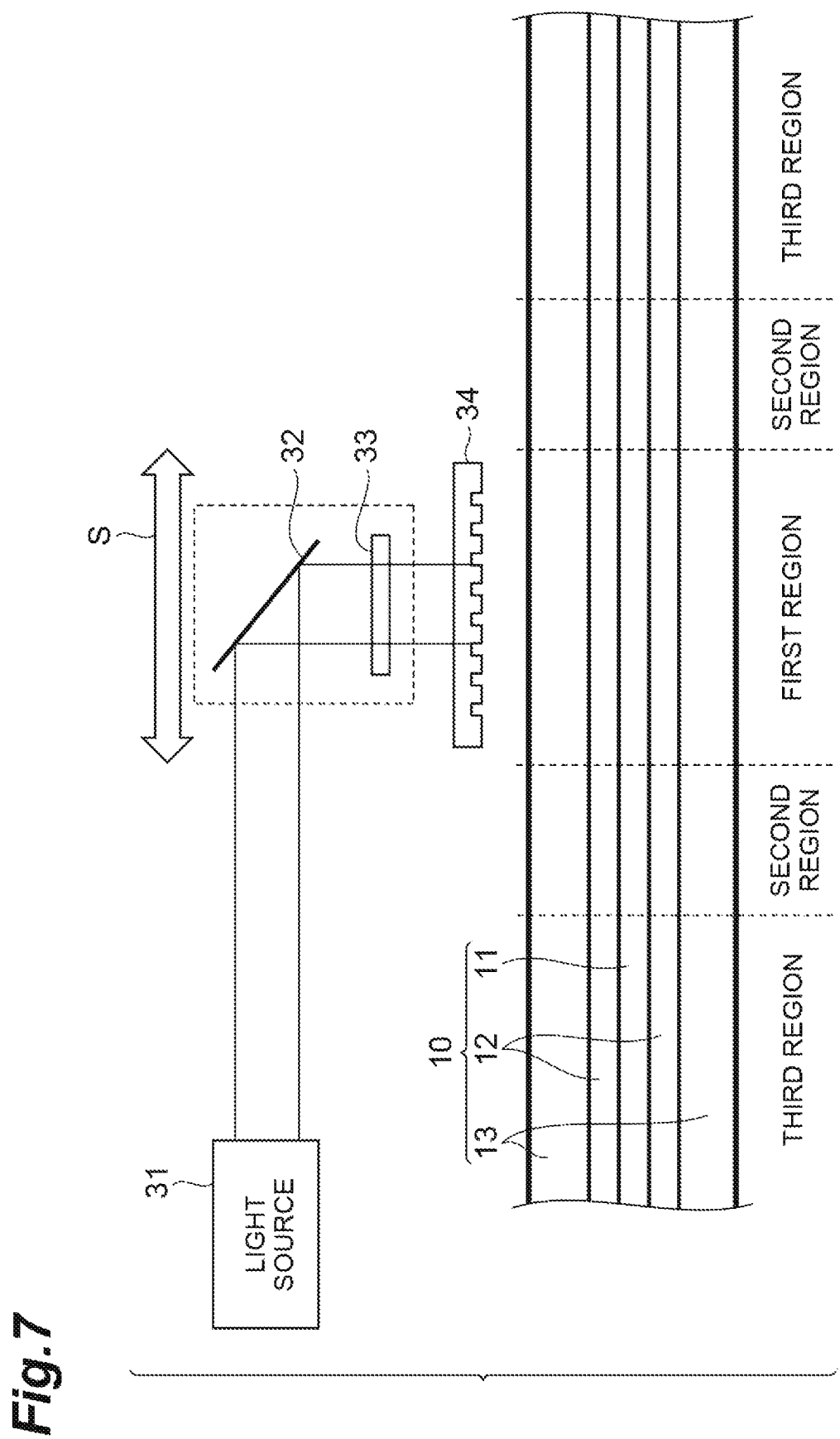
FIG. 7 is a diagram for explaining a method of forming a slanted Bragg grating.

FIG. 7 is a diagram for explaining a method of forming the slanted Bragg grating. Light outputted from a light source 31 is reflected by a mirror 32. Then, the first region is irradiated with the reflected light with sequentially passing through a cylindrical lens 33 and a phase mask 34. The light outputted from the light source 31 has a wavelength capable of increasing the refractive index of the region containing the photosensitive material. A light incident direction to the mirror 32 is parallel to the fiber axis direction. A light emitting direction from the mirror 32 is perpendicular to the fiber axis direction. The cylindrical lens 33 converges the light arriving from the mirror 32 in the fiber axis direction. The phase mask 34 is a substantially flat transparent plate n which a groove having a periodic structure is formed on the main surface facing the first region. The +1st-order diffracted light and the −1st-order diffracted light outputted from the phase mask 34 interfere with each other, and a slanted Bragg grating is formed based on the interference fringes. Further, the slanted Bragg grating is formed over a predetermined range of the first region by integrally moving the mirror 32 and the cylindrical lens 33 along the fiber axis direction.

The mode field diameter of the first region and the angle of the grating that realizes the zero slant angle have a correlation. Thus, the mode field diameter of the first region needs to be $MFD1_{\theta 1}$ corresponding to the desired grating angle θ1. When a relation between the irradiation amount of the ultraviolet light and the MFD increase amount is known, in principle, it is possible to obtain the irradiation amount $UV_{MFD-\theta 1}$ of the ultraviolet light required to obtain a mode field diameter $MFD1_{\theta 1}$ of the first region. However, the content of the photosensitive material in the optical fiber is not strictly uniform in the fiber axis direction, and the irradiation amount $UV_{MFD-\theta 1}$ of the ultraviolet light required to obtain the mode field diameter $MFD1_{\theta 1}$ is different. Therefore, it is difficult to control the mode field diameter $MFD1_{\theta 1}$ with high accuracy. Thus, the configuration of the SFG 1 as illustrated in FIG. 8 (another configuration of the SFG 1 according to the present embodiment) is preferable.

Figure 8:
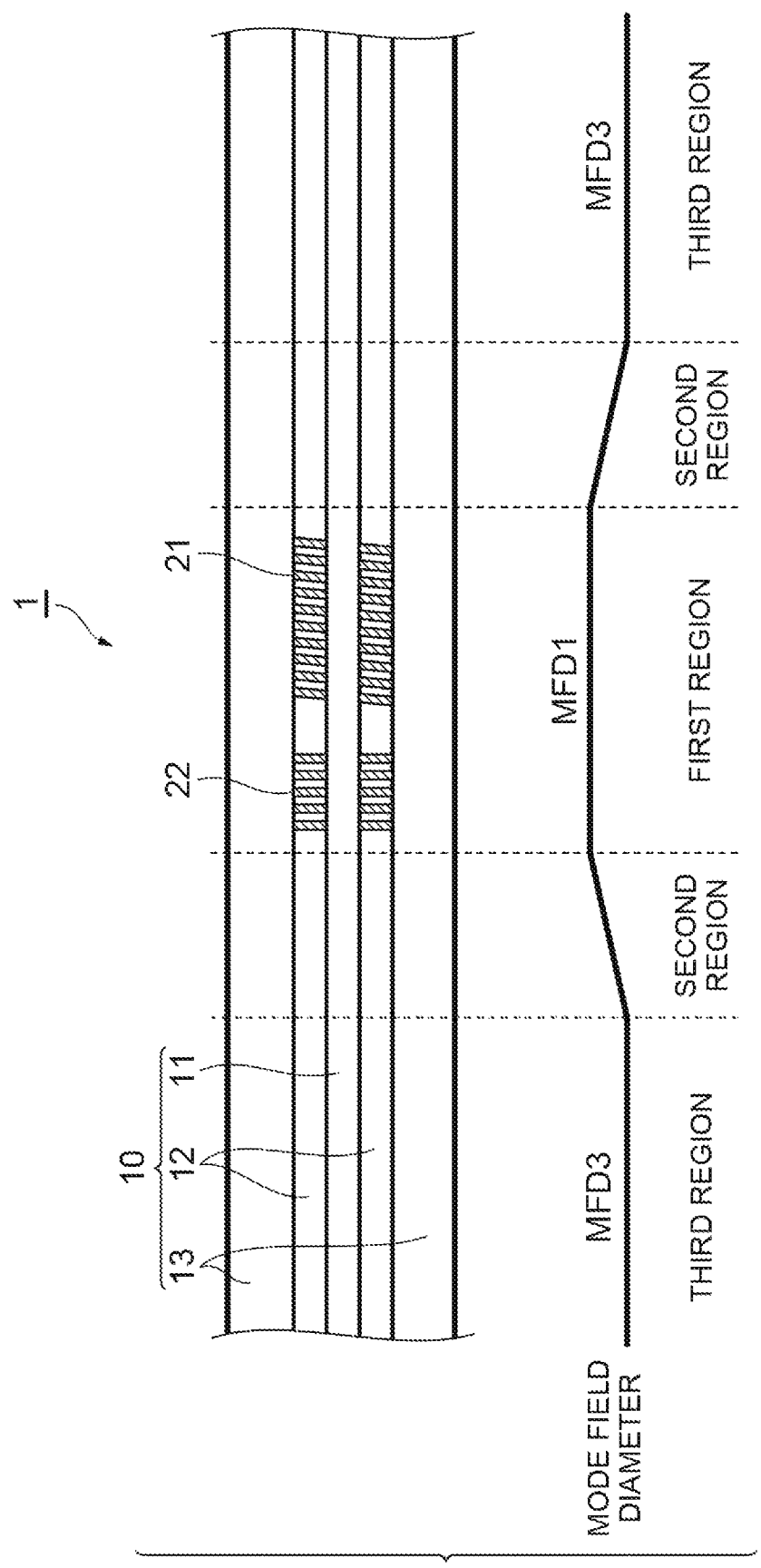
FIG. 8 is a diagram illustrating another configuration of the SFG 1 according to the present embodiment.

In the SFG 1 illustrated in FIG. 8, an MFD adjustment Bragg grating 22 is further formed in the first region in the configuration illustrated in FIG. 6. The MFD adjustment Bragg grating 22 is prepared to monitor the mode field diameter of the first region during the production of a predetermined MFD1 of the SFG 1. The MFD adjustment Bragg grating 22 is formed at a position different from the position of the slanted Bragg grating 21 in the fiber axis direction. The MFD adjustment Bragg grating 22 may be formed on any side with respect to the slanted Bragg grating 21.

The MFD adjustment Bragg grating 22 has an iso-refractive index surface perpendicular to the fiber axis. The iso-refractive index surface of the MFD adjustment Bragg grating 22 is parallel to the wave surface of the guided light. The MFD adjustment Bragg grating 22 Bragg-reflects light in a wavelength band different from the loss wavelength band of the slanted Bragg grating 21. A period Λ1 of the iso-refractive index surface of the MFD adjustment Bragg grating 22 corresponds to the central wavelength λ1 of the wavelength band of the light reflected by Bragg. When the loss wavelength band of the slanted Bragg grating 21 is the C band and the L band, λ1 is preferably a wavelength band of 1.00 µm to 1.50 µm or a wavelength band of 1.65 µm to 1.70 µm in order to avoid the interference with such a wavelength band.

When the irradiation amount of the ultraviolet light is increased, the refractive index of the first cladding 12 increases from $n_{clad1}$ before irradiation to $n_{clad1+UV}$. Thus, the mode field diameter increases from MFD3 before irradiation to MFD1. Since only the first cladding 12 in the optical fiber 10 contains the photosensitive material, the MFD adjustment Bragg grating 22 is written to the first cladding 12 in the same manner as the slanted Bragg grating 21. An increase in MFD corresponds to light leaking into the first cladding 12 on which the MFD adjustment Bragg grating 22 is written. That is, when the mode field diameter increases, the light quantity of the return light in a direction opposite to a traveling direction of the black wavelength λ1 increases. It is possible to form the predetermined $MFD1_{\theta1}$ with high accuracy by monitoring the light quantity of the return light having a wavelength of λ1.

The mode field diameter distribution in the second region along the fiber axis direction is realized by changing the irradiation amount of the ultraviolet light along the fiber axis direction. Specifically, the irradiation amount of the ultraviolet light required to realize $MFD1_{\theta1}$ is adjusted at the boundary between the first region and the second region. The irradiation amount of the ultraviolet light is adjusted to 0 at the boundary between the third region and the second region. By adjusting the irradiation amount of the ultraviolet light while integrally moving the mirror 32 and the cylindrical lens 33 in the fiber axis direction, the desired mode field diameter distribution as described above can be obtained.

In the above description, the setting of the mode field diameter MFD1 in the first region and the formation of the slanted Bragg grating are performed in separate steps. On the other hand, the setting of the mode field diameter MFD1 in the first region and the formation of the slanted Bragg grating can be performed at the same time. This will be described below.

In FIG. 7, the light intensity distribution in the interference fringes by the ±1st-order diffracted light outputted from the phase mask 34 has a bias and the degree of modulation depending on a distance between the optical fiber 10 and the phase mask 34. The longer this distance, the larger the bias and the smaller the degree of modulation. When the distance is further increased, the degree of modulation becomes 0, and the diffracted light generally observed in the far-field image is observed and becomes only the bias component. By adjusting the distance, it is possible to adjust a ratio between the magnitude of the bias and the degree of modulation. That is, by adjusting the distance between the optical fiber 10 and the phase mask 34, it is possible to increase the mode field diameter in accordance with the magnitude of the bias of the interference fringes, and it is possible to form the slanted Bragg grating 21 in accordance with the degree of modulation of the interference fringes.

The larger the mode field diameter MFD1 of the first region, the smaller the angle of the grating that realizes the slant angle θ=0 of the slanted Bragg grating 21 (angle formed by the optical propagation wave surface of the LP01 mode and the iso-refractive index surface of the grating). The full width at half maximum α of the fundamental spectrum decreases. Under the conditions of MFD1, the angle of the grating at the slant angle θ=0 is equal to or smaller than 5 degrees, preferably equal to or smaller than 3 degrees, and the optimum is equal to or smaller than 1.5 degrees. Further, the full width at half maximum a of the fundamental spectrum is equal to or smaller than 2.5 nm, preferably equal to or smaller than 2.0 nm, and the optimum is equal to or smaller than 1.5 nm.

Next, an optical fiber structure capable of achieving both the reduction of the full width at half maximum α of the fundamental spectrum and the above-described high grating writing ability will be described. In the optical fiber 10 in which only the first cladding 12 contains the photosensitive material, the governing factor of the grating writing ability is a ration of the type and content of the photosensitive material contained in at least a portion of the first cladding 12, to the leakage amount of guided light to the first cladding 12. Note that, FIG. 3 illustrates an example in which the entirety of the first cladding 12 contains the photosensitive material.

In the optical fiber 10, the photosensitive material is preferably $GeO_2$, and it is also preferable that $GeO_2$ and $B_2O_3$ are co-doped. Further, it is also preferable that the first cladding 12 and the second cladding 13 contain F.

It is preferable that the mode field diameter MFD3 of the third region is from 8 µm to 11.5 µm. Further, the mode field diameter MFD1 of the first region is preferably from 12 µm to 22 µm.

As described above, ultraviolet light ($UV_{MFD1-\theta1}$) for setting the mode field diameter of the first region to MFD1 and ultraviolet light ($UV_{grating}$) for forming a grating are required. When the relative refractive index difference increased by irradiation with ultraviolet light ($UV_{MFD1-\theta1}$) to set the mode field diameter to MFD1 is set as $\Delta n_{clad1+uv}$, and the relative refractive index difference increased by irradiation with ultraviolet light ($UV_{grating}$) to form the grating is set as $\Delta n_{grating}$, the amount of increase in the refractive index of the formed grating is $\Delta n_{clad1+uv} + \Delta n_{grating}$. Thus, there is an appropriate content of the photosensitive material required to form $\Delta n_{clad1+uv} + \Delta n_{grating}$.

For example, when the $GeO_2$ content of the first cladding 12 is smaller than 0.35% as a ratio of the amount $\Delta n_g$ of increase in the refractive index due to $GeO_2$ at the concentration to the refractive index of pure $SiO_2$ glass, it is difficult to form $\Delta n_{clad1+uv} + \Delta n_{grating}$. Therefore, the $GeO_2$ content of the first cladding 12 needs to be equal to or greater than 0.35%, preferably equal to or greater than 0.40%, and more preferably equal to or greater than 0.45%. Co-addition of $B_2O_3$ and $GeO_2$ is also effective. The doping amount of $B_2O_3$ is equal to or smaller than −0.20%, preferably equal to or smaller than −0.30%, and more preferably equal to or smaller than −0.40%, as a ratio of the amount $\Delta n_g$ of increase in the refractive index due to $GeO_2$ at the concentration to the refractive index of pure $SiO_2$ glass. As described above, the doping amount of co-doped $GeO_2$ is equal to or greater than 0.35%, preferably equal to or greater than 0.40%, more preferably equal to or greater than 0.45%, as a ratio of the amount $\Delta n_g$ of increase in the refractive index to the refractive index of pure $SiO_2$ glass.

In the optical fiber structure of the third region, the ratio of the leakage amount of guided light to the first cladding 12 in a wavelength band of 1.55 µm is equal to or greater than 10% and smaller than 40%, preferably equal to or greater than 15% and smaller than 35%, and more preferably equal to or greater than 20% and smaller than 30%. In the first region forming the grating structure, the ratio of the leakage amount in the wavelength band of 1.55 µm is from 30% to 80%, preferably from 35% to 75%, and more preferably from 40% to 70%.

A typical core 11 has a diameter of 7.5 µmφ to 9.5 µmφ. The relative refractive index difference Δn of the core 11 is from 0.25 to 0.40%. There are three major types of tilt of the refractive index profile of the first cladding 12, which are a case rising from the center of the core toward the second cladding, a case falling, and a flat case. The rising and falling cases may be linear or non-linear, or may be stepped. What is important is that the optical fiber structure may be designed in compliance with the ratio of the leakage amount of the guided light to the first cladding 12 described above.

The ratio ($r_{clad}/r_{core}$) of the radius $r_{clad}$ of the first cladding 12 to the radius $r_{core}$ of the core 11 is preferably from 3.0 to 4.0.

REFERENCE SIGNS LIST

1 . . . SFG (slanted fiber grating); 10 . . . optical fiber; 11 . . . core; 12 . . . first cladding (optical cladding); 13 . . . second cladding (jacket); 21 . . . slanted Bragg Grating; 22 . . . MFD adjustment Bragg grating; 31 . . . light source; 32 . . . mirror; 33 . . . cylindrical lens; and 34 . . . phase mask.

The invention claimed is:

1. A slanted fiber grating comprising:
an optical fiber comprised of silica-based glass, the optical fiber including
a core extending along a fiber axis direction,
a first cladding surrounding the core in a cross section perpendicular to the fiber axis direction, the first cladding having at least a portion containing a photosensitive material and having a refractive index lower than a refractive index of the core, the photosensitive material increasing a refractive index of the portion by irradiation with light with a specific wavelength, and
a second cladding surrounding the first cladding in the cross section, the second cladding having a refractive index that is lower than the refractive index of the core and higher than the refractive index of the first cladding,
wherein a specific section located between two different points arranged along the fiber axis direction in the optical fiber is configured with
a first region having a first mode field diameter at a wavelength of 1.55 μm and including a slanted Bragg grating having an iso-refractive index surface tilted to the cross section, the slanted Bragg grating being provided in a region corresponding to the first cladding,
a pair of second regions arranged along the fiber axis direction to sandwich the first region, and
a pair of third regions arranged along the fiber axis direction to sandwich both the first region and the pair of second regions, the pair of third regions having a second mode field diameter smaller than the first mode field diameter at the wavelength of 1.55 μm,
wherein an entire section corresponding the first region except the slanted Bragg grating has the refractive index higher than that of an entire section corresponding to the third region, and
the entire section corresponding to the first region including the slanted Bragg grating has the refractive index higher than that of the entire section corresponding to the third region.

2. The slanted fiber grating according to claim 1, wherein the first cladding contains $GeO_2$ as the photosensitive material.

3. The slanted fiber grating according to claim 1, wherein the first cladding further contains $B_2O_3$ as the photosensitive material.

4. The slanted fiber grating according to claim 1, wherein both the first cladding and the second cladding contain F.

5. The slanted fiber grating according to claim 1, wherein the second mode field diameter in each of the pair of third regions is equal to or smaller than 11.5 μm.

6. The slanted fiber grating according to claim 1, wherein the first mode field diameter in the first region is equal to or greater than 12.0 μm.

7. The slanted fiber grating according to claim 1, wherein the mode field diameter at the wavelength of 1.55 μm in one of the pair of second regions gradually decreases along a direction from one end portion of the first region toward one of the pair of third regions, and
the mode field diameter at the wavelength of 1.55 μm in the other of the pair of second regions gradually decreases along a direction from the other end portion of the first region toward the other of the pair of third regions.

8. The slanted fiber grating according to claim 1, wherein a length of the first region defined along the fiber axis direction is from 10 mm to 100 mm.

9. The slanted fiber grating according to claim 1, wherein the first region includes an MFD adjustment Bragg grating disposed at a position different from the slanted Bragg grating along the fiber axis direction, the MFD adjustment Bragg grating having an iso-refractive index surface perpendicular to the fiber axis direction and Bragg-reflecting light in a wavelength band different from a loss wavelength band of the slanted Bragg grating.

* * * * *